United States Patent [19]

Lapeyre et al.

[11] Patent Number: 4,779,139
[45] Date of Patent: Oct. 18, 1988

[54] DESK TOP COMPUTER TERMINAL AND CABINET WHICH ELIMINATES REFLECTION AND GLARE FROM VISUAL DISPLAYS

[75] Inventors: James M. Lapeyre; James O. Gundlach, both of New Orleans, La.

[73] Assignee: The Laitram Corporation, Harahan, La.

[21] Appl. No.: 884,950

[22] Filed: Jul. 14, 1986

[51] Int. Cl.⁴ .................. H04M 5/72; H04M 5/64
[52] U.S. Cl. .................................... 358/252; 358/255; 312/7.2; 350/276 R
[58] Field of Search .................. 358/252, 254, 255; 350/276 R, 280; 312/7.2

[56] References Cited

U.S. PATENT DOCUMENTS

| | | | |
|---|---|---|---|
| 2,604,536 | 7/1952 | Rose | 312/7.2 |
| 3,036,154 | 5/1962 | Harman | 312/7.2 |
| 3,541,256 | 11/1970 | Anders | 358/254 |
| 3,804,504 | 4/1974 | Scott | 358/254 |
| 4,440,457 | 4/1984 | Fogelman et al. | 312/7.2 |
| 4,569,572 | 2/1986 | Kopich | 358/252 |

Primary Examiner—Edward L. Coles, Sr.
Attorney, Agent, or Firm—James C. Kesterson

[57] ABSTRACT

A desk top CRT visual display system for eliminating reflections and glare with respect to an observer having a selected eyepoint is disclosed. The system includes a CRT 18 having a viewing plane 30. The CRT 18 is oriented with respect to a nomimal eyepoint 22 of an observer such that the viewing plane 30 is at a selected angle of between 70° and 30° with respect to a line of sight extending from the selected nominal eyepoint 22. The system is supported by a desk top 26 which also typically supports keyboard 28 at a viewing position juxtaposed to the visual display CRT 18. The system also includes a light obstructing top shield 16 having a front edge 44 and a light absorbing under surface 46. The front edge 44 of light obstructing shield 16, and the display angle of the viewing plane 30 of CRT 18 are selected such that a light path extending from the eyepoint 22 to any point on the viewing plane 30 is reflected into the light absorbing surface 46 of light obstructing top shield 16. This thereby substantially eliminates all glare and reflections originating from an ambient light source when the screen is viewed from the nominal eyepoint 22.

4 Claims, 2 Drawing Sheets

DESK TOP COMPUTER TERMINAL AND CABINET WHICH ELIMINATES REFLECTION AND GLARE FROM VISUAL DISPLAYS

TECHNICAL FIELD

This invention relates generally to a desk top visual display which eliminates visible reflections and glare, and more particularly to a desk top CRT terminal and cabinet having a visual display. Unlike prior art visual displays which eliminate glare and reflections, the desk top CRT terminal of this invention provides most of the features and advantages of the support cabinet disclosed in copending application Ser. No. 697,262 and yet may be placed and used on a desk top without modification of the desk top. It permits glare-free viewing from a range of eye positions without requiring adjustment.

BACKGROUND ART

With the greatly increased use of word processors and personal computer terminals having CRT displays in both the workplace and home, the problem of reflection and glare has become acute. Such reflection and glare, now represents one of the major objections and problems associated with long and continuous use of CRT type and other visual display. Although the problem has existed for years with television and other CRT displays, extremely long term continuous viewing was not generally required. A television viewer seldom if ever, is required to read fine print from close range and is able to shift his head positions or move his entire body to a different viewing location in the room to avoid reflections or glare on the television screen. Unfortunately, with respect to computer and word processor terminals and the like, the operator *must* maintain eyepoint within a relatively limited range of positions, usually within arms length, since he or she must be within reading distance of the relatively small characters on the screen and may also be required to refer to other written input data sources and/or a keyboard which is located proximate the visual display. Consequently, freedom of head motion so as to find a location where reflections and glare from the CRT screen are not objectionable may not be possible without considerable muscle strain. The basic concept of such glare and reflection reduction used by the present invention was first disclosed in U.S. Pat. No. 4,032,222 issued to J. M. Lapeyre. As disclosed in that patent, the natural and still common practice of orienting the display plane of a visual display at right angles with the line of sight from an observer's eyepoint may represent the worst possible orientation for such a light emitting display. As is further disclosed in that patent, glare can be eliminated by proper orientation of the display plane of the visual display in combination with the use of a light obstructing shield. As disclosed in the aforementioned Lapeyre patent, the inventive concept may be used with many and varied light emitting displays. In addition, U.S. Pat. No. 4,235,523 also to Lapeyre discloses and claims a very important use of the original concept as it applies to traffic signals. It will of course be appreciated that traffic signals being located outdoors are subjected to extreme glare and are particularly subjected to glare from the sun. Other patents considered relevant to the basic concept during the prosecution of of the U.S. Pat. No. 4,032,222 include U.S. Pat. Nos. 2,162,791 to Shreve; 2,819,459 to Dodd; 3,499,112 to Heilmeir, et al; 3,531,178 to Wirth; 3,566,602 to Bergey, et al; and 3,881,805 to Hosokawa, et al. In addition, various electronic arcade games and pocket-size portable television receivers incorporate the basic concept of the original Lapeyre U.S. Pat. No. 4,032,222. However, to this date, the applicants are not aware of any CRT terminal with a display and cabinet capable of eliminating visible reflections and glare without requiring a modified desk top to allow the neck of the CRT to be recessed.

Therefore, it is an object of the present invention to provide a desk top visual display system whereby visible reflection and glare is eliminated with respect to a limited but adequate range of eyepoints called the nominal eyepoint.

A further object if to provide a glare-free desk top terminal which requires no angular adjustment for use by various persons during the course of the workday.

It is another object of the present invention to provide a desk top computer terminal display system which operates in conjunction with an input keyboard to eliminate glare and reflection and minimize necessary eye movement between the keyboard and the display.

A further object of the invention is to provide a desk top terminal which has an enhanced contract ratio and consequently may be read at lower electromagnetic radiation levels.

A further object is to provide a desk top unit without glare and visible reflections which is positionable at the proper focal distance for the reading of displayed text.

DISCLOSURE OF THE INVENTION

Other objects and advantages will in part be obvious and will in part appear hereinafter, and will be accomplished by the present invention which discloses a unique desk top visual display system. The visual display includes a CRT having a front viewing plane with a neck extending from the back of the CRT away from the viewing plane. A housing defines a base support plane adapted for resting on a horizontal support surface, and includes means for fixedly mounting and orienting the CRT such that the end position of the CRT neck is below eye level and is proximate the base support plane. The CRT being further mounted and oriented with respect to a nominal eyepoint of an observer such that the viewing plane of the area of display of the CRT screen is at a selected display angle of between about 70° and 30° with respect to a line of sight extending from the nominal eyepoint to the midpoint of the display area of the CRT screen. A light obstructing shield having a front edge and a light absorbing under surface extends toward the eyepoint and is supported and positioned by the housing such that a line extending from the front edge to a top limit of the area of display forms an acute angle with the viewing plane. The front edge extends sufficiently forward, and the display angle and acute angle are selected such that a light path extending from the eyepoint to any point on the viewing plane of the area of display is reflected into the light absorbing under surface of the shield. This arrangement substantially eliminates all glare and visible reflections originating from ambient light regardless of the source. In one preferred embodiment, the housing supporting the light obstructing shield also supports light absorbing side panels which cooperate with the shield to improve the contract ratio of the area of display.

BRIEF DESCRIPTIONS OF THE DRAWINGS

The above mentioned features of the present invention will be more clearly understood from the consideration of the following description in connection with the accompanying drawings wherein.

BEST MODE FOR CARRYING OUT THE INVENTION

Figure 1:
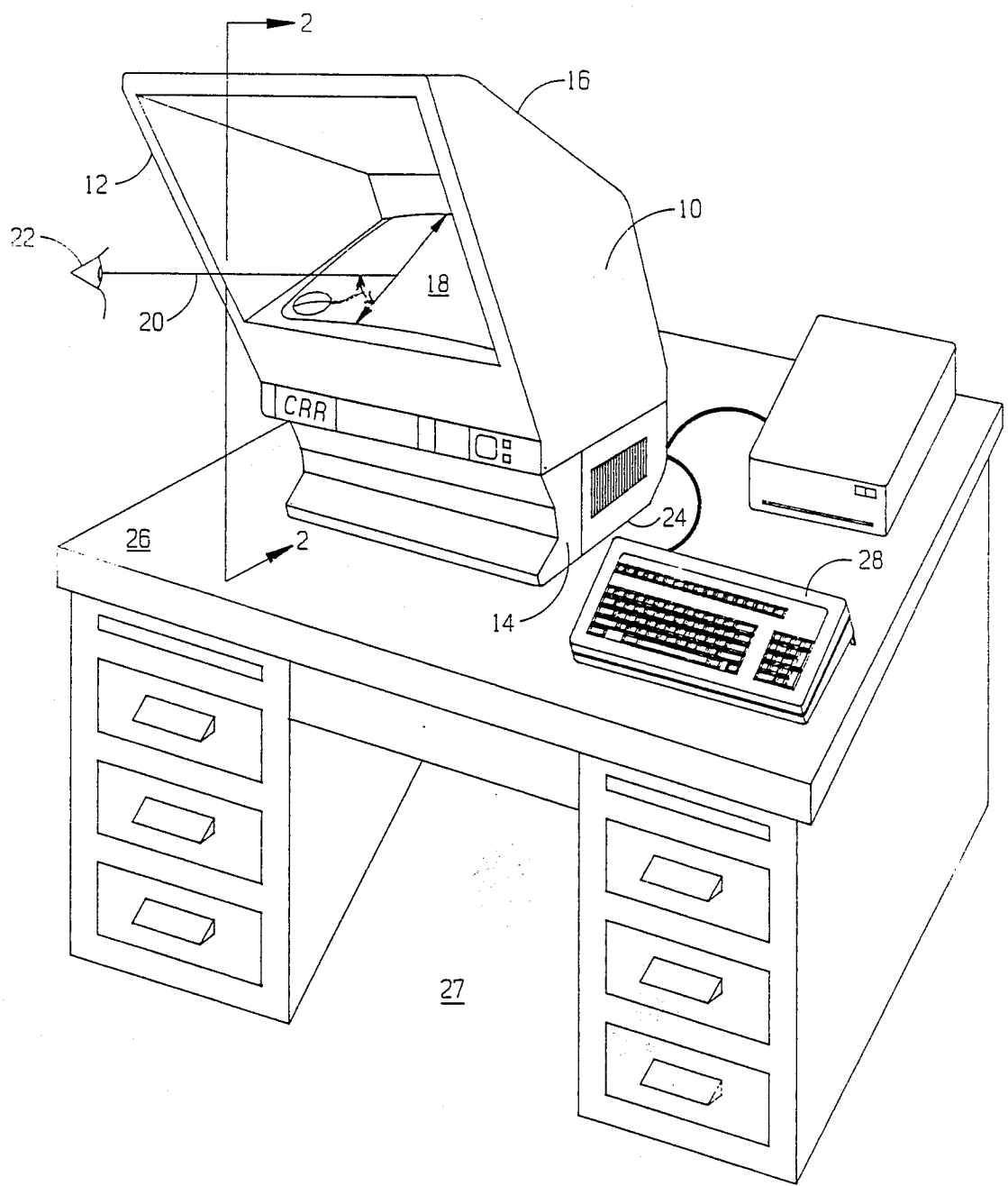
FIG. 1 is a perspective view of a desk top CRT visual display system incorporating the features of the present invention.

Referring now to FIG. 1, there is shown a perspective view of a desk top CRT visual display system employing the features of this invention. As disclosed in this embodiment, the CRT display system includes a first cabinet side 10 and a second cabinet side 12 both of which extend from a base portion 14, to a top shield member 16. Below top shield member 16 it can be seen that the screen or face of a CRT tube 18 is supported such that it makes a selected display angle $\theta$ of between about 70° and 30° with respect to a line of sight 30 emanating from a nominal eyepoint 22 to the midpoint of the CRT. Base portion 14 terminates at a flat bottom or base support plane 24 which rests on end is supported by a horizontal support surface such as desk top 26. When the CRT visual display system of this invention is intended for use as a computer terminal display, there will be included a keyboard terminal 28 which allows data input to the computer terminal. Also, as shown, desk 26 provides a recess 27 for the knees of a seated operator (not shown). Thus, it will be appreciated that the visual display system is particularly suitable for use by an operator seated at a desk. The desk top 26 may also be used to support other components of a computer system such as a disc drive 28 or a printer (not shown) for providing a typed copy of date.

Figure 2:
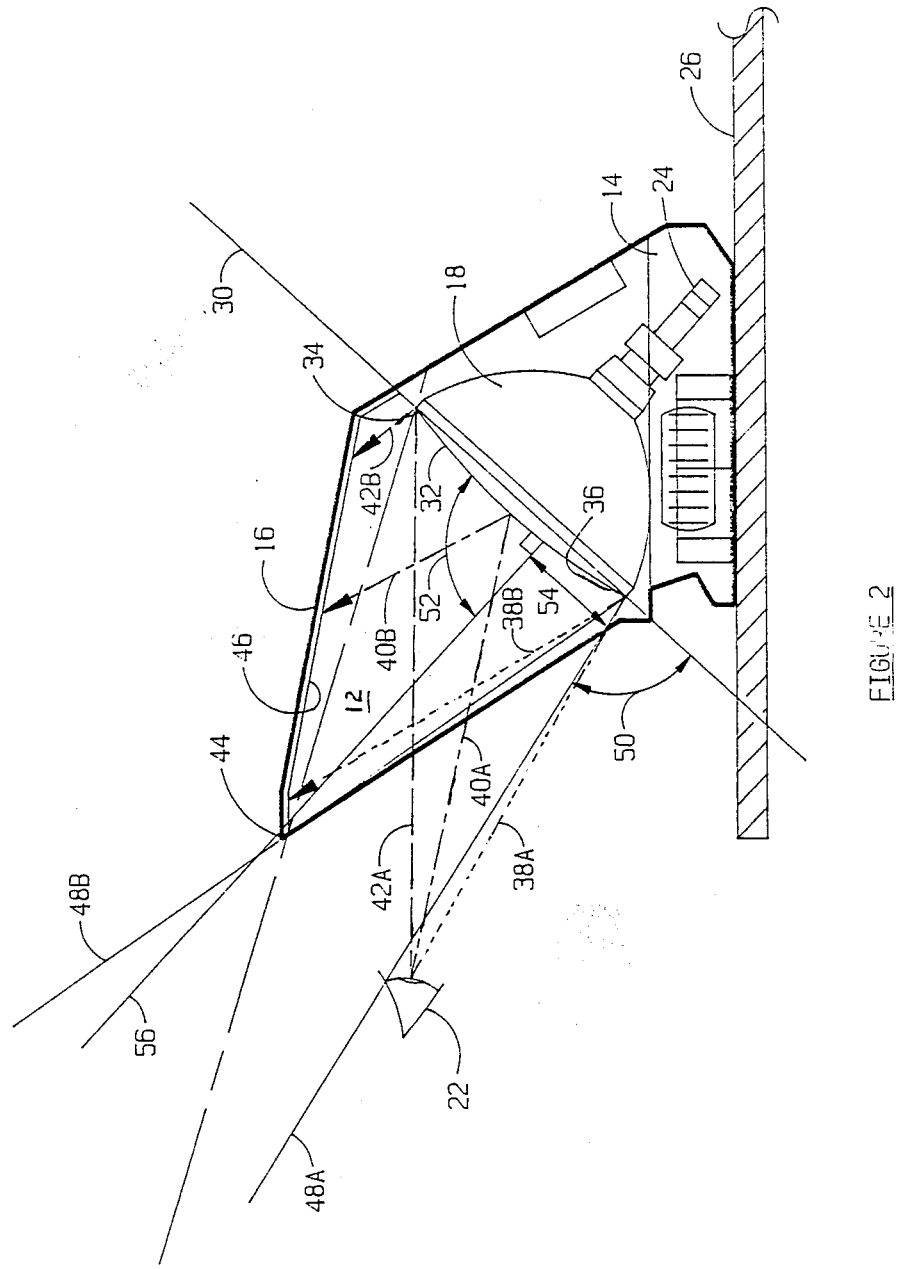
FIG. 2 is a cross-section of the cabinet of FIG. 1 taken along lines 2—2.

Referring to FIG. 2, there is illustrated a cross-sectional view of FIG. 1 of the CRT visual display system. Those components shown in FIG. 2 which are the same as shown in FIG. 1 will carry the same reference numbers. FIG. 2 illustrates the nominal eyepoint 22 of an observer viewing the screen of the CRT 18 which of course, is located in the cabinet. In the cross-sectional view of FIG. 2, it is seen that the selected display angle as discussed above, is between about 70° and 30°, and that the line 30, represents a viewing plane defined by the screen 32 of CRT 18. It will be appreciated by those skilled in the art that the actual surface of a typical CRT screen is not perfectly planar. Therefore, a nominal plane, or viewing plane will be used to represent an average of all the possible viewing surfaces. Also, as can be seen more clearly in this FIG. 2, the CRT has an upper edge 34 and a lower edge 36. It will, of course, be appreciated that all meaningful information will be displayed within these upper and lower edges. Typically, the meaningful information displayed on the CRT screen will extend substantially to the upper and lower edges. However, in some applications, the meaningful information may be restricted to a limited area of the CRT screen. The area of the CRT screen where meaningful information is displayed is referred to hereinafter as the display area. As will be appreciated by those skilled in the art, the laws of basic physics require that with respect to a reflecting or mirror surface, the angle of incidence of a light path is equal to the angle of reflectance. Thus as shown in FIG. 2, dotted line 38A will strike the viewing display plane 30 of the CRT 18 at a particular angle. The light path will then be reflected from this bottom edge of the display area of the CRT screen at a similar angle. This means that the light path 38A will leave the eyepoint 28, be reflected off of viewing plane 30 of the CRT 18 and then reflected away from the viewing plane 30 at an angle equal to the angle of incidence as indicated by dotted line 38B. In a similar manner, the alternating dashed and dotted line 40A from the eyepoint 28 will be reflected from the viewing plane 30 at the midpoint of the CRT screen 32 at an angle similar to its angle of incidence as is indicated by the line 40B. Likewise at the top 34 of the CRT screen 32 or display area, a light path 42A extending from eyepoint 28 will also be reflected at a reflection angle equal to the angle of incidence as is indicated by the dashed line 42B. At this point, it is important to note that the front edge 44 of top shield member 16 of the cabinet extends forward toward the eyepoint such that the light path 38B is intersected. Also, of course, as is clearly seen, the other light paths 40B and 42B are also intersected by top member 16 and would of course be intersected even if the front edge 26 did not extend as great a distance toward the eyepoint 28. Thus, it will be appreciated by those skilled in the art that if the under surface 46 of top member 16 is not reflective, but instead has light absorbing characteristics, it will be impossible for glare to be reflected by the light absorbing shield 16 from any ambient source back to the eyepoint 22 of an observer.

This means of course, that since any lines of sight extending from nominal eyepoint 22 to the display area of CRT screen 32 will be reflected from the viewing plane 30 onto the light absorbing underside 46 of top shield member 16, in a similar manner there can be no glare or visible reflections reaching nominal eyepoint 22. In fact, as will become clear hereinafter substantially all glare and visible reflections off of CRT screen 32 will also be eliminated at every other possible eyepoint (in addition to nominal eyepoint 22) which lies below line 48A. The location of line 48A is determined by reflecting a line 48B (representative of a beam of light) which passes through front edge 44 of top member 16 off of the bottom-most portion 36 of the area of display of CRT screen 32. The reflection angle 50 of line 48A is the same as the incidence angle 52 of line 48B. The elimination of all glare and visible reflections into nominal eyepoint 22 occurs even though the top shield member 16 does not completely cover the display area when viewed orthogonally. For example, in the embodiment shown in FIG. 2 top shield member 16 only covers about ⅔ of the area of display (from an orthogonal view), leaving about ⅓ uncovered. The uncovered portion is indicated by double headed arrow 54 representing that bottom portion of the area of display 32 which extends from bottom edge 36 to the line 56. Line 56 is perpendicular to viewing plane 30 and passes through the front edge 44.

It should also be understood that although some glare and reflections may exist at the bottom portion 54 of CRT screen 32 for an eyepoint (other than nominal) located within the vector bounded by lines 48A and 48B, a substantial portion of the CRT screen 32 will still be completely glare-free with no visible reflections. Thus although the present invention has been described with respect to a specific design and embodiment for providing a desk top visual CRT display system which eliminates visible reflections and glare, it is not intended that such specific references be considered as limitations upon the scope of this invention except insofar as set forth in the following claims.

We claim:

1. A desk top CRT (cathode ray tube) visual display system for eliminating reflection and glare with respect to an observer having an eyepoint at a nominal position comprising:
    a CRT having a display area which defines a viewing plane, and a neck extending from the back of said CRT and away from said viewing plane to an end portion;
    a housing defining a base support plane adapted for resting on a horizontal support surface, said housing including means for fixedly mounting and orienting a CRT such that the end portion of said CRT neck extending from the back of said CRT is below said eyepoint and proximate said base support plane, said CRT being further mounted and oriented with respect to said nominal eyepoint of said observer such that the viewing plane of said CRT is at a selected display angle of between 70° to 30° with respect to a line of sight extending from said nominal eyepoint; and
    a light obstructing shield having a front edge and a light absorbing surface, said light absorbing shield being supported and positioned by said housing such that a line extending from said front edge to a top edge of said display area of said CRT forms an acute angle with said viewing plane of said CRT, and said front edge extends sufficiently forward, and said display angle and said acute angle being selected such that a light path extending from said eyepoint to any point on said display area is reflected into said light absorbing surface of said light obstructing shield thereby substantially eliminating all glare and visible reflections originating from ambient light.

2. The CRT visual display system of claim 1 and further including light absorbing side panels supported by said housing and joined to said light obstructing shield.

3. The CRT visual display system of claims 1 or 2 wherein said nominal eyepoint is located outside of a sector formed by a light beam passing through the front edge of said light absorbing shield and reflecting off the bottom-most portion of the display area of said CRT.

4. A method of providing a CRT (cathode ray tube) visual display for eliminating reflection and glare with respect to an observer having an eyepoint at a nominal position comprising the steps of:
    providing a CRT having a front screen which defines a viewing plane, and a neck with an end portion extending from the back of said CRT away from said front screen;
    fixedly mounting and orienting aid CRT by a housing defining a base support plane adapted for resting on a horizontal support surface such that the end portion of said neck extending from the back of said CRT is below said nominal eyepoint and proximate said base support plane;
    further mounting and orienting said CRT by said housing such that the viewing plane of said CRT is at a selected display angle of between 70° to 30° with respect to a line of sight extending from said nominal eyepoint;
    mounting and supporting by said housing a light obstructing shield having a front edge extending toward said eyepoint and a light absorbing under surface such that a line extending from said front edge to a top edge of the display area of said CRT screen forms an acute angle with said viewing plane of said CRT screen; and
    extending said front edge sufficieintly forward and selecting said acute angle such that a light path extending from said eye-point to any point on said display area of said CRT screen is reflected into said light absorbing surface of said light obstructing shield thereby substantially eliminating all glare and reflections originating from ambient light.

* * * * *